(12) United States Patent
Troutman

(10) Patent No.: US 7,965,980 B2
(45) Date of Patent: Jun. 21, 2011

(54) CELL BUOY SYSTEM

(75) Inventor: Joseph M. Troutman, Lambertville, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 703 days.

(21) Appl. No.: 11/731,380

(22) Filed: Mar. 30, 2007

(65) Prior Publication Data

US 2007/0232364 A1    Oct. 4, 2007

Related U.S. Application Data

(60) Provisional application No. 60/788,691, filed on Apr. 3, 2006.

(51) Int. Cl.
*H04B 7/185* (2006.01)

(52) U.S. Cl. ........................ 455/13.1; 455/446

(58) Field of Classification Search ............... 455/11.1, 455/13.1, 550.1, 128, 129, 422.1, 444, 446
See application file for complete search history.

(56) References Cited

U.S. PATENT DOCUMENTS

| 5,119,500 A * | 6/1992 | Bickel | 455/15 |
|---|---|---|---|
| 6,778,809 B2 * | 8/2004 | Morimoto | 455/11.1 |
| 7,595,814 B2 * | 9/2009 | Harper | 348/81 |

\* cited by examiner

*Primary Examiner* — Tu X Nguyen
(74) *Attorney, Agent, or Firm* — Henry I. Schanzer, Esq.

(57) ABSTRACT

A cellular communication system includes an array of buoys disposed in a body of water. Each buoy includes a completer cellular system including a cellular transmission/reception site and associated electrical equipment for processing cellular signals. Each buoy also includes a wave energy converter (WEC) responsive to waves in the body of water for generating electrical energy for powering the associated equipment processing the cellular signals, whereby the cellular system can be continuously operated without any additional power source.

14 Claims, 8 Drawing Sheets

CELL BUOY SYSTEM

This invention claims priority from provisional application Ser. No. 60/788,691 for Cell Buoy System filed Apr. 3, 2006 whose contents are incorporated herein by reference.

BACKGROUND OF THE INVENTION

This invention relates to apparatus and methods for enabling the use of cellular phones for communication while at sea (offshore) using a cellular infrastructure.

A problem exists in that there is currently no cost effective mobile communication system available for individuals when more than a few miles out at-sea, other than on-board ship radio systems. A need exists for an economical and reliable communication system which allows users of cell phones to use their mobile units when more than a few miles out at sea such that they can communicate with other users out at sea and also reach an on-shore network. Currently, as shown in FIGS. 1 and 2, the typical range for cellular service at sea is approximately 2 miles off the coastline of the mainland (e.g., the United States). This is possible due to an existing cellular network which consists of cellular towers that transmit/receive located along the shore line, as shown in FIGS. 1 and 2. These figures illustrate the deployment of transmit/receive cell towers in a land based cellular system. As shown, a geographic area may be divided into contiguous hexagonal areas (each hexagon defining a "cell") with transmit/receive cell towers located in the center of the hexagon (cell). In FIGS. 1 and 2, by way of example, the distance from the center antenna tower to the coverage edge is shown to be approximately 1.7 miles. Therefore, as shown in FIG. 2, a mobile user can access cellular towers located along the coastline for a distance of up to approximately 1.7 miles off the coast. A cell phone can not be used reliably much beyond this limited distance.

This presents a very limited range and a significant problem. By way of example, fishermen or any one on any ship going 5-20 miles out to sea can not use their mobile cell phones to communicate with others out at sea or with any one on shore.

An object of the invention is to provide a cellular communication system which enables cellular communication over a large expanse of water and between points at a significant distance from shore to other points on-shore and off-shore.

SUMMARY OF THE INVENTION

One aspect of the invention includes the recognition that a buoy with a wave energy converter can be used to power a cellular system mounted on the buoy thereby substantially reducing the need for an external power source and any concern for providing power for the cellular system. As a result, the cellular buoy is essentially self-powered and eliminates or decreases the need to have an external power supply to power the cellular system. As a result, an external power supply (e.g., batteries) is only necessary as a back-up for emergency situation. Consequently, the need to install a heavy duty power supply is essentially eliminated and the need to maintain, service or replace the external supply on a regular basis has been significantly reduced.

Another aspect of the invention is that a large number of self-powered cellular buoys may be deployed in a predetermined arrangement over a large body of water to provide cellular (line of sight) communication, over the body of water, between mobile users located far from shore and between users located offshore and onshore.

In the discussion to follow and in the appended claims a "cellular buoy" is defined as a buoy on which is mounted cellular transmission/reception equipment and which includes a wave energy converter (WEC) for powering the cellular equipment.

A cellular communication system embodying the invention includes a number N of "cellular" buoys, where N is an integer equal to or greater than one (1), where the N buoys are deployed in a body of water, each cellular buoy includes cellular transmission/reception equipment mounted on the buoy and a wave energy converter (WEC) for converting energy in the waves, present in the body of water, into electrical energy to power its associated cellular transmission/reception equipment. The cellular buoys are deployed such that the cellular transmission/reception equipment located on the cellular buoys, deployed in the body of water, enables cellular communication between different off-shore sites (other cellular buoys) and between the off-shore sites and land based cellular transmission/reception sites.

A cell-buoy system embodying the invention includes transmission and reception equipment (e.g., a transceiver) housed on a buoy and powered by a wave energy converter (WEC) incorporated in the buoy. Each cellular buoy includes a transmitter/receiver antenna for providing cellular coverage over a predetermined geographical area. There may be one transmitter/receiver antenna. Alternatively there may be more than one transmitter antenna and more than one receiver antenna. The power supplied by the wave energy converter (WEC) enables operation of the cellular equipment for an extended period of time without the need for an external power supply.

The cellular buoy includes wave energy converter means for powering the radio frequency (RF) equipment required to receive and transmit cellular service between any number of buoys located off shore and between the offshore buoys and land based communication cells. This includes the receiver, transmitter, processor, antenna, and all the ancillary and associated communication equipment. The cellular buoy also includes means for providing a stable mounting platform for the antenna system to ensure that the antenna(s) remain generally vertical for efficient and reliable transmission. In addition, the cellular buoy provides means for securing and protecting the buoy from damage during heavy sea conditions.

Each cellular buoy provides the power necessary to operate a complete cellular system that has the capability to provide cell service to a fixed area. The buoy provides the power source and can also act as a hub or link between the cellular areas serviced by each buoy. That is, the cellular buoys are able to receive a call from any user within its cell area and to transfer the call from buoy to buoy to provide a greater distance for call transmission. The number of buoys and coverage area per buoy may be determined based upon power demand of the RF equipment and the height of the antenna above the water surface. Any number of buoys outfitted with a cellular system may be placed in the ocean. The "grid matrix" of buoys has no limit and therefore any number of buoy cells may be deployed.

An important aspect of this invention is that the WEC can provide an offshore power source to cellular transmission system to extend the cellular coverage beyond a limited offshore boundary.

BRIEF DESCRIPTION OF THE DRAWINGS

In the accompanying drawings (which are not drawn to scale) like reference characters denote like components.

DETAILED DESCRIPTION OF THE INVENTION

Figure 1:
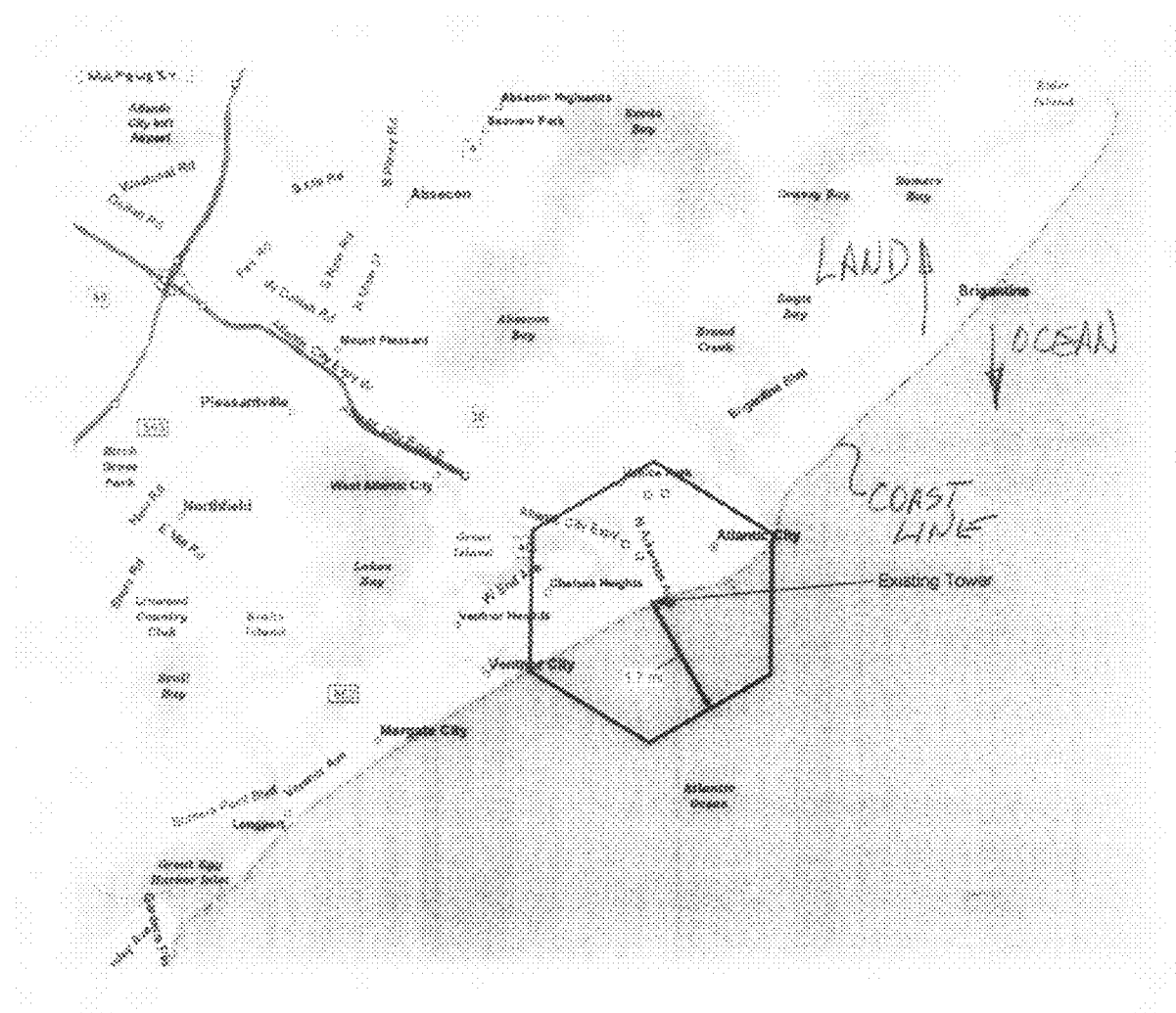
FIG. 1 is a drawing of a prior art land based cell tower, located along the coast of a land mass abutting a large body of water, showing the limited offshore cellular communication coverage which is provided by the cell tower.
Figure 2:
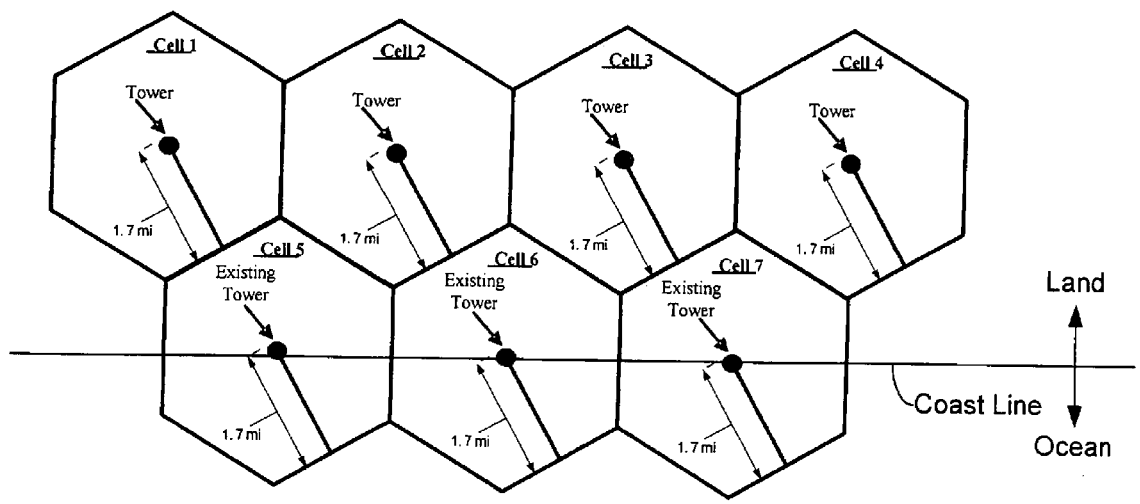
FIG. 2 is a simplified drawing of a prior art cellular communication system showing land based cell towers for receiving and transmitting cellular signals arranged to provide cellular coverage over a desired geographical area.
Figure 3:
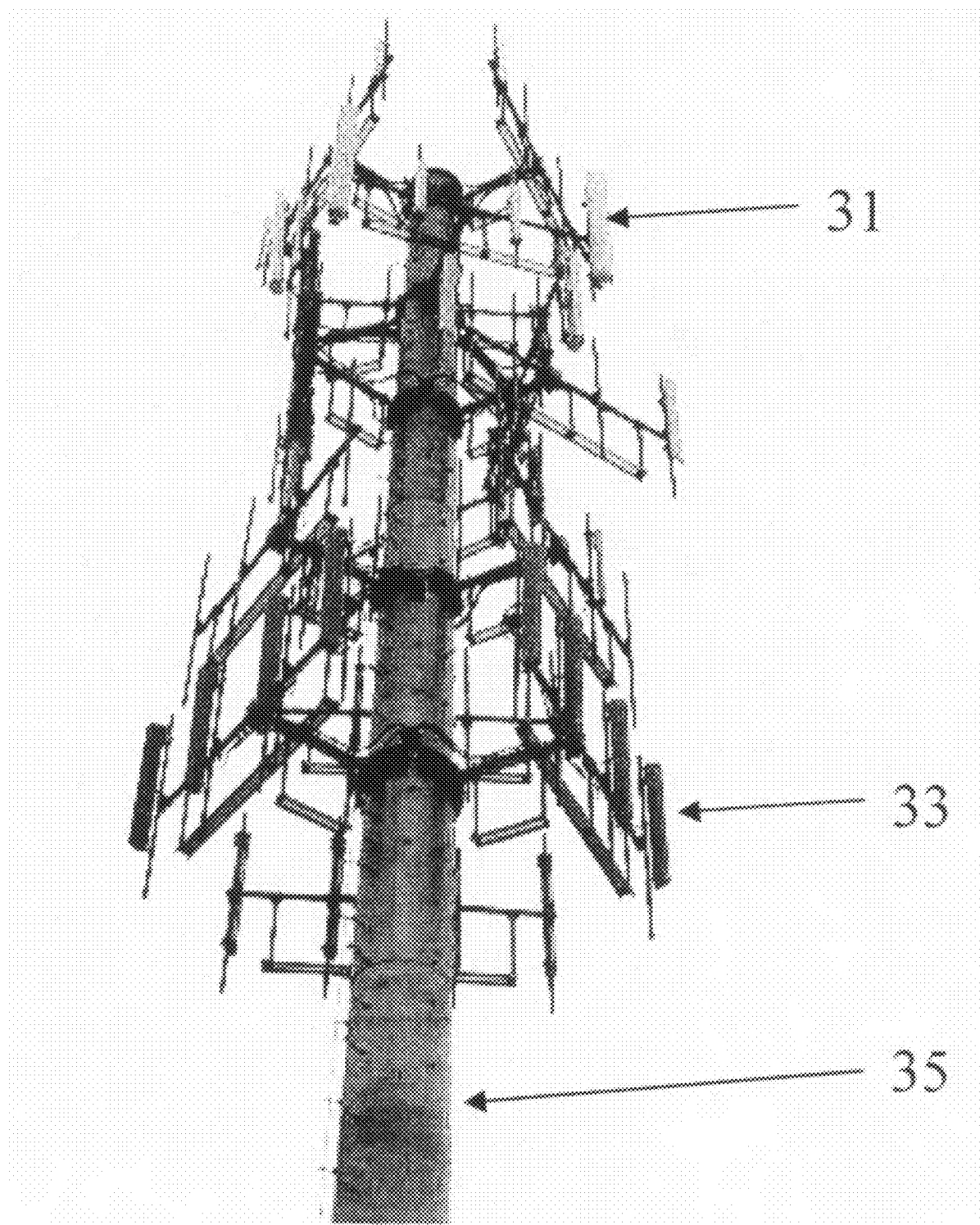
FIG. 3 is a pictorial representation of transmitting and receiving antennas mounted on a pole which may be part of a land based tower.
Figure 3A:
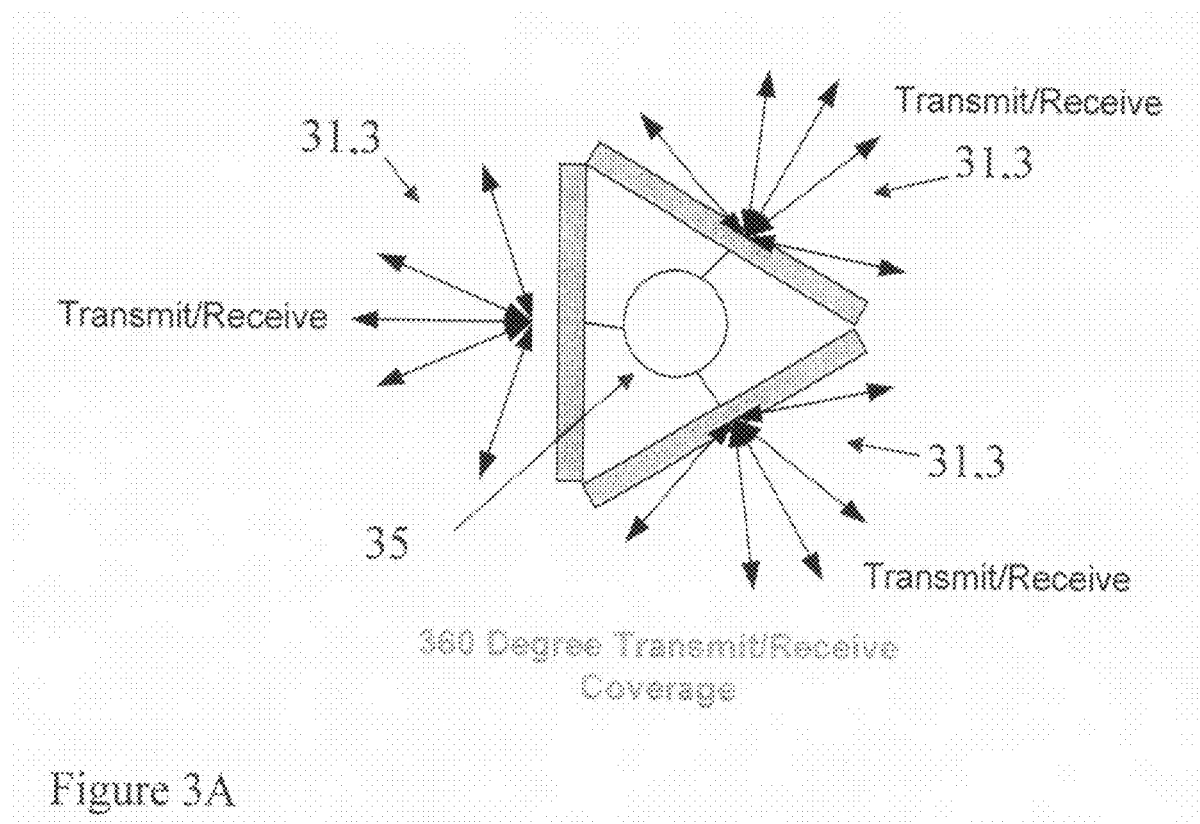
FIG. 3A is a simplified top view of transmit and receive antennas arranged for 360 degree transmit/receive coverage.

Referring to FIG. 3, there is shown an example of an existing land based cellular tower antenna structure. The antenna arrangement used in the cellular buoys system may be similar to the antenna arrangement of land based cellular towers. The antenna system includes a transmit antenna 31 and a receive antenna 33, both being mounted on a pole or shaft 35 which, on land, may be part of a tower. To enhance reception and transmission several different antennas may be used as shown in the FIG. 3. However, it should be appreciated that a single transmit/receive antenna may be used. Cellular communication requires a line-of-sight transmission environment. The antennas may be mounted on the support structure 35 in an arrangement to allow for reception and transmission of the cellular signal around a 360° radius, as shown schematically in FIG. 3A.

Figure 4:
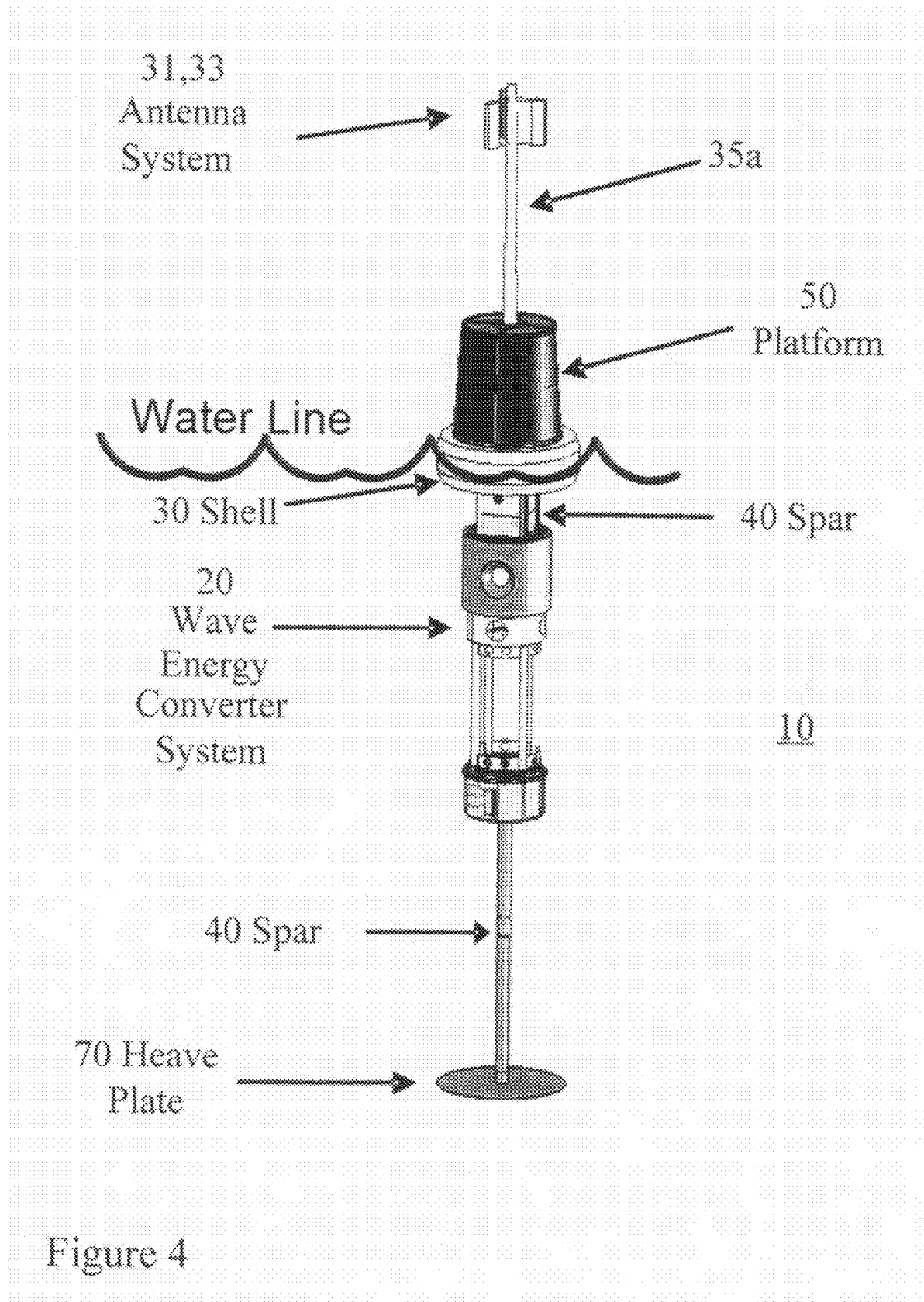
FIG. 4 is a highly simplified drawing of a portion of a cellular buoy including a wave energy converter (WEC) used to practice the invention.

FIG. 4 is a pictorial representation of a cellular buoy 10 with its incorporated antenna system 31, 33 mounted on an antenna support (mast) 35a, serving a similar function as tower 35. The buoy includes a shell (float) 30 and a spar 40 on which is mounted a platform 50 to which a mast 35a is connected. FIG. 4 shows a cellular buoy 10 which includes a wave energy converter (WEC) system 20 which converts wave motion into useable electricity which may be used to power the receive and transmit antenna system, control electronics and associated electrical equipment. The WEC system includes a power take off (PTO) device coupled between the shell 30 and the spar 40. The power required by the receive/transmit circuitry is supplied by the WEC system on a continuous basis throughout the lifetime of the off-shore cellular system. In FIG. 4, a heave plate 70 is shown attached to the spar in a plane perpendicular to the direction of motion of the spar. The heave plate provides stability to the spar and the antenna, where stability includes maintaining the antennas 31, 33 and the antenna support 35a relatively vertical and perpendicular to the water surface under all operating and weather conditions.

In this application, reference to "mobile units" refers to portable cellular phones people use. Each cellular buoy includes a transmission/reception site which includes at least one transmitter/receiver antenna, although usually there is at least one antenna for transmission and a different antenna for reception. Each antenna provides cellular coverage for a given geographical area. Cellular buoys embodying the invention include means for generating the electrical power for the electrical/electronic equipment. In the operation of the system it should be appreciated that all calls are transmitted and received by receptor sites and sent to a switching office where they are then sent to the appropriate location called by the cellular customer.

An important aspect of this invention is that the cellular buoy includes a WEC which can provide an offshore power source to an existing cellular transmission system to extend the cellular coverage beyond a limited offshore boundary.

Figure 5:
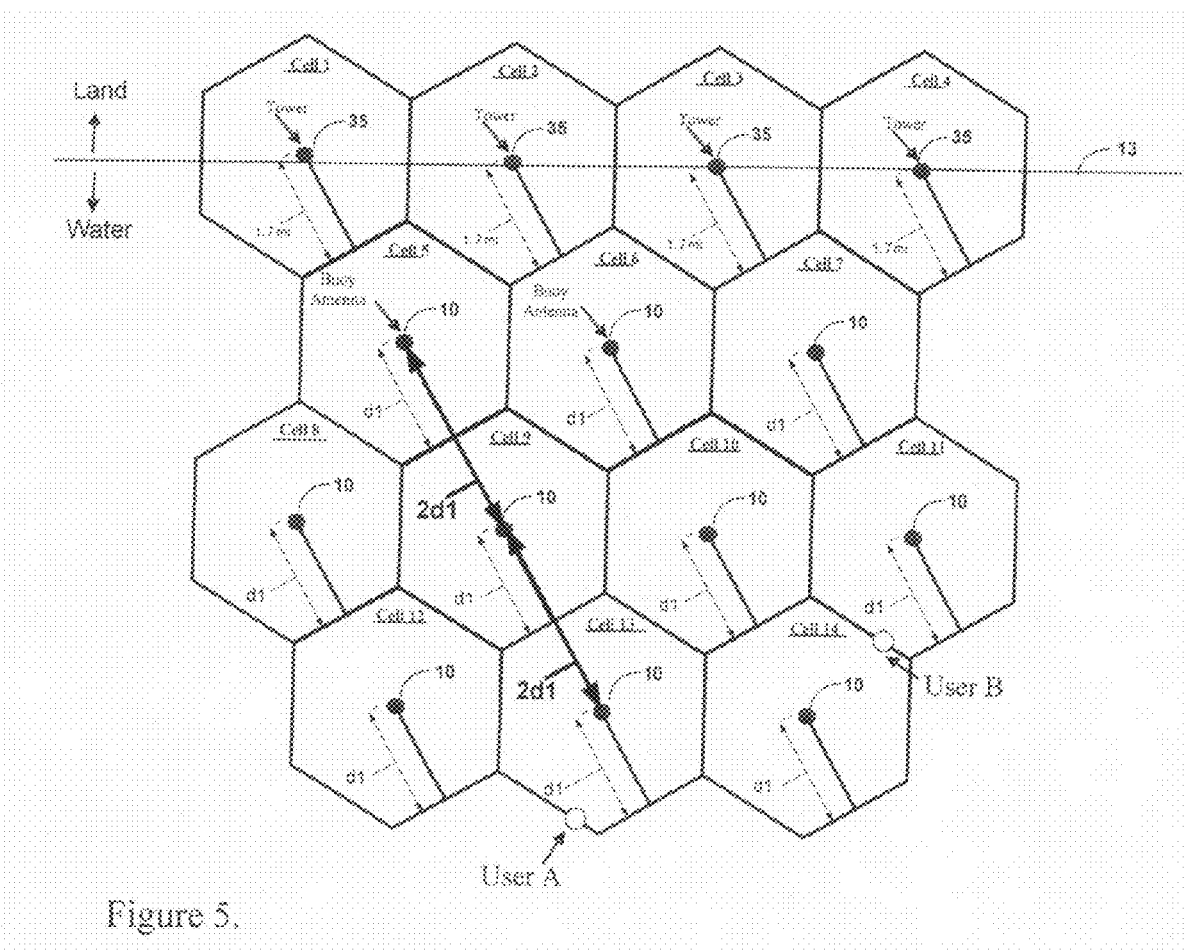
FIG. 5 is a simplified diagram of cellular buoys deployed off shore integrated with a series of land based cellular towers for providing cellular communication over a large body of water and land in accordance with the invention.

Referring to FIG. 5 there is shown land based cells 1 through 4, each having a receive/transmit tower 35 located on land along the shore line 13. By way of example, it is assumed that any mobile cell user within 1.7 miles of a tower 35 can communicate with that tower 35 and the tower can then transfer the signal to another neighboring tower. The distance of 1.7 miles (approximately 2 miles) is by way of illustration only and, depending on the equipment/power used, the distance of the range from the center of a cell to its outer periphery could be less, or greater, than 2 miles.

FIG. 5 shows that an array of cellular buoys 10 can be integrated with a land based cellular system. Thus, in FIG. 5 there is also shown an array of cellular buoys (cells 5-14) deployed over a large body of water (ocean). The cellular buoys in cells 5, 6, and 7 (closest to shore) would be located (approximately) within a distance of 1.7 miles plus $d_1$ miles of the land based towers 35. The cellular buoys in cells 8 through 11 would be generally located (approximately) within a distance of $2d_1$ miles of the buoys in cells 5-7 and the cellular buoys in cells 12-14 would also be generally located (approximately) within a distance of $2d_1$ miles of the buoys in cells 8-11. The distances (e.g., $2d_1$) between the buoys is a function of the transmit power and of the antenna height. Where the transmit power is greater and the height of the antenna above the water surface is increased, the distances between the cellular buoys can be made greater. Hence, the distances between the different cellular buoys and between the different cellular buoys and the land based towers may be varied (i.e., the distances may be made greater or smaller).

By way of example, FIG. 5 shows a mobile user "A" a distance $d_1$ from the cellular buoy 10 in cell 13 who can communicate via cellular transmission with the receiver/transmitter on/in cell 13 and which transmission can then be transferred to any of the other cells deployed in the area and which can also be relayed to the costal towers 35. Similarly, cellular transmission is possible for any other mobile user (e.g., user B) within the range of any cellular buoy.

Figure 7:
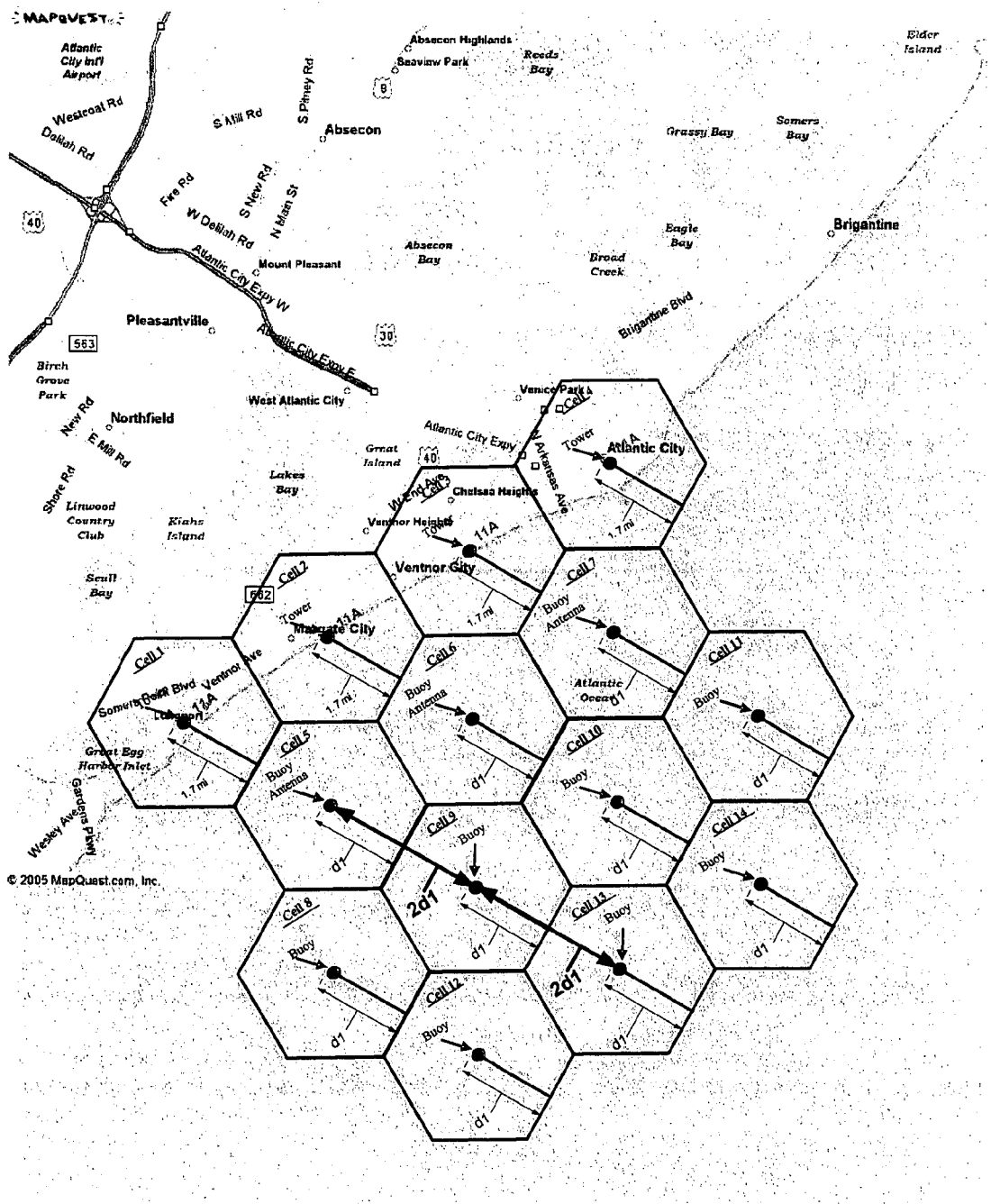
FIG. 7 is a simplified drawing of a cellular communication system embodying the invention showing an array of cellular buoys integrated with land based cell towers for receiving and transmitting cellular signals over a large body of water and land.

Assume for example that the cellular buoys 10 in cells 5-7 closest to the coast line are located within a distance of 1.7 miles plus $d_1$ miles off the coastline from the existing coastline cellular towers 35. This distance may be made somewhat longer if the land-based transmitting system is more powerful and/or the height of the land based antenna is increased. A cellular buoy system embodying the invention may be configured to increase the cellular communication range for many miles beyond the prior art maximum transmit coverage area. FIG. 7 shows, by way of example, the potential extension in the range of coverage off the coast of Atlantic City, N.J. where several coastline cellular towers currently exist.

Another important feature of the Cell Buoy system is its capability to provide a stable antenna platform by maintaining the tilt motions of the buoy within 20° from vertical. This reduces losses in the communication link.

The range of the cellular buoy system is a function of transmit power and antenna height. That is, the greater the transmit power and the higher the height of the antenna the greater is the communication distance between cell buoys, with acceptable performance.

Figure 6:
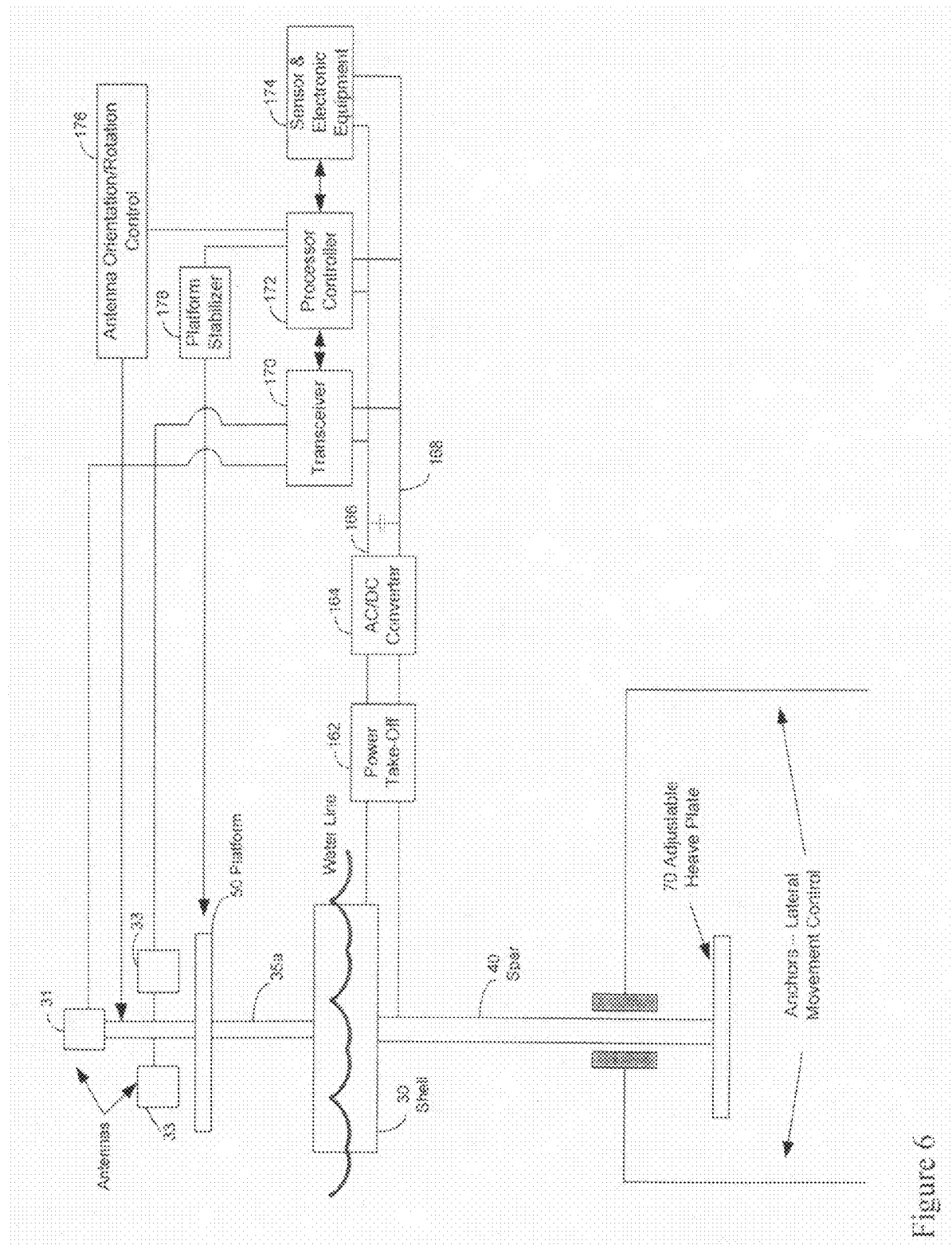
FIG. 6 is a simplified block diagram of a cellular buoy including a wave energy converter for producing electric power which is distributed to the cellular transmission/reception equipment and other electronic and control systems in accordance with the invention.

Referring to FIG. 6 there is shown a cellular buoy 10 having a shell 30 and a spar 40 with a power take off (PTO) device 162 coupled between the shell and spar to convert their relative motion into electric energy. The power take off (PTO) is responsive to the movement of the waves. PTO 162 is coupled to an AC/DC converter 164 to produce a relatively well regulated voltage (DC) which is applied to various system components to power their operation. By way of example, the output lines 166, 168 of the converter are shown to distribute power to the transceiver (transmitter/receiver) 170, a processor/controller 172 and to various sensors and pieces of electronic equipment 174 on, or in, the buoy requiring power. The transceiver 170 is coupled to the receive/transmit antennas 31, 33 mounted on a mast 35a to receive RF signals from other cells and directly from mobile cell users within its cell area and/or to transmit RF signals to other cells and directly to mobile cell users within its cell area. Transmission and reception may be further controlled by means of the processor/controller 172 which monitors and controls the communication.

In addition, the processor/controller may include control means 176 responsive to various sensors for controlling the orientation of the antenna in order to maximize the receive transmit operation.

Still further, the processor/controller 172 may include control means 178 responsive to various sensors for controlling the stability of the platform to ensure that the mast supporting the antenna(s) remains relatively vertical at all times to enhance transmission and reception. This is in conjunction with (or separate from) means for adjusting the heave plate 70 which also functions to maintain the stability of the spar and hence of the buoy.

It should be appreciated that the invention provides a cost effective mobile communication system available for consumers at-sea and allows consumers to use their cellular phone for communication while at sea using a cellular infrastructure. Consumers are thus able to use their existing cellular phone to communicate between different offshore points and between different offshore points and points on land using cellular buoys integrated with existing land cellular infrastructure. This can proceed without any change to a consumer's phone plan (no extra charges) and communication from land and over a large body of water is only limited by the quantity of cellular buoys deployed over the body of water.

In accordance with the invention, there is now a reliable, readily available, low cost communication system which is not limited to land based equipment. The cellular buoy allows a user to communicate anywhere within their existing calling plan with their cellular provider while at sea. The cellular buoy system provides the necessary cellular receive and transmit antenna system acting as a cellular communication system identical to that which exists on the land.

Applicant's invention incorporates a low power receive/transmit transponder with, for example, an omni antenna system into its wave energy converting buoy to offer a self powering off-shore cellular communication structure. Applicant recognized that at sea (or ocean) there exist fewer obstructions to line of sight communication than on land. Thus, for cellular buoys being spaced apart a similar distance than land base towers, lower transmit power is required. Alternatively, the fewer obstructions allow greater spacing between the buoys for a given transmit power. The low power needs of the communication system, when operating in a large body of water, results in a small, easily deployable buoy, which is designed to provide a maintenance free operating life of many (e.g., 5 or more) years.

The use of an omni antenna compensates for the motion of the buoy due to its interaction with the wave climate and doesn't restrict the direction from which the receive/transmit signal is originating. The omni antenna provides a completed 360-degree communication field.

The power generation requirements for a cellular buoy should be sufficient to operate the communication electronics, buoy internal control and monitoring electronics and harness and system losses. The cellular buoy has an internal control system continually monitoring the performance of the communication payload and buoy health and operational status. The buoy provides a constant performance data stream to land to allow the cellular provider to monitor and control the payload and buoy operation. During periods of extreme wave conditions, the buoy operates in a self-protection mode. During the self-protection mode, the buoy monitors the movement of the wave energy conversion system to determine if the wave environment is an extreme condition, which may cause damage to the buoy during its operation. The buoy monitors each reaction to individual waves and protects itself from damage (e.g., temporarily locking the components of the buoy).

The cellular buoy design provides a stable antenna platform through the use of a simple mooring system and proper hydrodynamic design properties. The simple mooring system provides the necessary station keeping features that eliminate the drifting or movement of the buoy within the off-shore cellular field. The quantity of cellular buoys within a field is dependent upon the distance from shore where communication capability is required. By way of example, cellular buoys may be placed at a separation distance of 5 miles (or more) and may extend off the shore line covering an entire coast line within the fishing and sport boating regions off the coastline. Cellular buoys could also be placed to cover the shipping lanes used by commercial and entertainment (cruise lines) vessels.

Various wave energy converter (WEC) systems are known. For example reference is made to U.S. patent application Ser. No. 09/379,421 filed Aug. 21, 1999; Ser. Nos. 10/762,800; 10,080,181 filed Feb. 20, 2002; and to Ser. No. 11/030,933 filed Jan. 7, 2005, all assigned to the assignee of the present application and the teachings of which are incorporated herein by reference.

What is claimed is:

1. A cellular communication system for extending cellular communication between shore locations operating within a frequency range and offshore locations operating within the same frequency range includes:

A matrix array of buoys located in a body of water extending a predetermined distance (L) along the shore and a predetermined distance (D) away from the shore and each buoy located with respect to another buoy to permit defined and secured line of sight cellular transmission between and among the buoys over an area of the body of water equal to, at least, L times D;

each buoy including:

(a) a wave energy converter (WEC) for converting the energy in waves present in the body of water into electrical energy and for supplying that energy to a transceiver mounted on the buoy; and (b) the transceiver for transmitting and receiving cellular signals at frequencies compatible with the frequencies of the shore locations; and wherein the array of buoys includes a first group of buoys deployed at regular distances along the shore and a second group of buoys deployed at regular intervals along the first group away from the shore, wherein each buoy includes a transceiver providing cellular transmission and reception within a geographic area defined herein as a cell area and the buoy and its transceiver is generally centrally located within its cell area; and wherein the cell areas of the buoys of the array are contiguous to permit multiple transmission paths and line of sight cellular communication over the area L times D of the body of water between cell phone users located offshore and onshore, with the cellular transmission and reception being at cellular frequencies compatible with the frequencies of the shore locations.

2. A cellular communication system as claimed in claim 1, wherein the cellular communication system includes at least one shore based transceiver for communicating with an offshore based transceiver; and wherein a cell phone user can use the same cell phone on shore or while traveling within the geographic area L times D in the body of water.

3. A cellular communication system as claimed in claim 2, wherein each buoy includes means for controlling the orientation of the antenna to optimize reception and transmission of cellular signals; and enable communication between any location within the area L times D and a shore location.

4. A cellular communication system as claimed in claim 2, wherein the buoy includes sensors for sensing waves exceeding predetermined limits for protecting the transceiver and the buoy from forces exceeding predetermined limits.

5. A cellular communication system as claimed in claim 2, wherein the buoy includes signal processing equipment coupled to the transceiver and electronic equipment for controlling selected systems of the buoy; and wherein the WEC supplies power to operate all the equipment.

6. A cellular communication system as claimed in claim 2, wherein the buoy includes a platform for mounting the antenna and means for stabilizing the platform and wherein the WEC provides power to the stabilizing means.

7. A cellular communication system as claimed in claim 2, wherein the buoy includes a platform for mounting the antenna and wherein the buoy includes a shell and a column and wherein a heave plate is coupled to the column for stabilizing the column and the platform.

8. A cellular communication system for extending cellular communication between shore locations operating within a predetermined frequency range and offshore locations comprising:

an array of buoys disposed in a body of water, extending along and away from the shore, and each buoy disposed with respect to another buoy to permit line of sight cellular transmission between buoys;

each buoy including a cellular system including a transmission/reception site operable within said predetermined frequency range and associated electrical equipment for processing cellular signals within said predetermined frequency range; and each buoy also including a wave energy converter (WEC) responsive to waves in the body of water for generating electrical energy for powering the cellular system and associated equipment for processing the cellular signals, without the need for a power source other than that of the WEC; and said array of buoys deployed to provide multiple paths to signal transmission and to enable communication over the body of water between cell phone users located offshore and a land-based cellular system operating within said predetermined frequency range.

9. A cellular communication system as claimed in claim 8, wherein the array of buoys includes a first group of buoys with their transceivers deployed along the shore and second group of buoys with their transceivers deployed along the first group farther away from the shore, and wherein each buoy includes a complete cellular system capable of providing cell service to a fixed area and for communicating with the cellular systems of neighboring buoys;

and wherein the buoy's WEC includes means for providing power to the complete cellular system.

10. A cellular communication system as claimed in claim 8, wherein each buoy includes a complete cellular system for transferring a call from the buoy to any other buoy.

11. A cellular communication system as claimed in claim 8, wherein the cellular system of each buoy functions as a link between adjacent cellular areas with each cellular system being powered by its buoy's WEC; and wherein the array of buoys provides means for transferring signals between individual buoys and between the buoys and land based cellular towers.

12. A cellular communication system as claimed in claim 9, wherein the area serviced by the cellular system of a buoy is a function of the power of the transceiver and the height of the antenna above the surface of the water.

13. A cellular communication system as claimed in claim 8, wherein the number of buoys is greater than two.

14. A cellular communication system as claimed in claim 8, wherein the array of buoys includes a first group of buoys deployed along the shore and second group of buoys deployed along the first group away from the shore, wherein each buoy includes a transceiver providing cellular transmission within a geographic area defined herein as a cell area and the buoy and its transceiver is generally centrally located within its cell area; and wherein the cell areas of the buoys of the array are contiguous to provide secure and reliable line of sight cellular communication operating within said predetermined frequency range over the body of water for cell phone users traveling about the array of buoys located far from shore and between cell phone users located offshore and onshore.

* * * * *